March 7, 1944.  F. G. FOLBERTH ET AL  2,343,656
FLUID PRESSURE ACTUATED MOTOR
Filed March 6, 1941  7 Sheets-Sheet 1
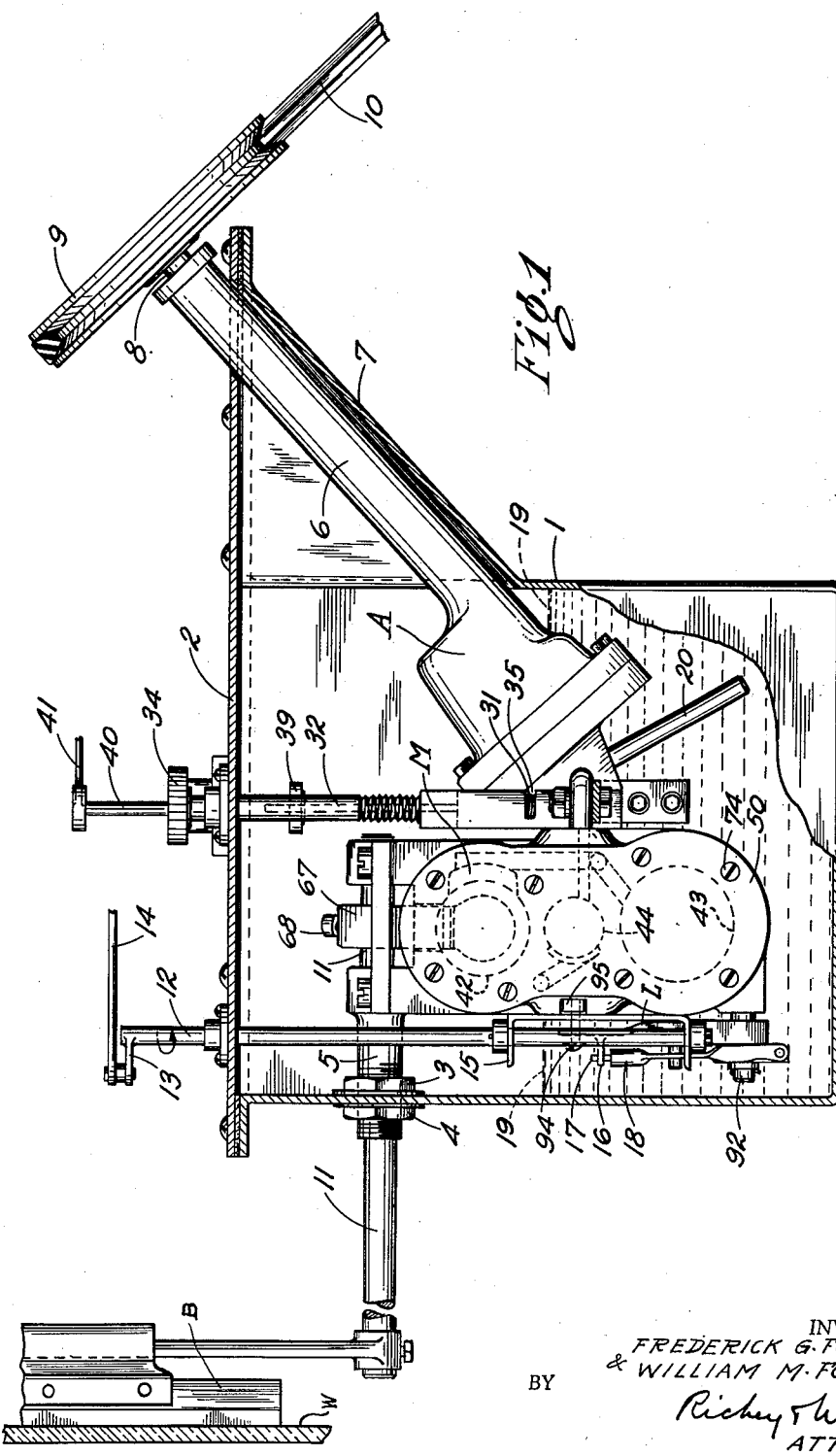
INVENTORS
FREDERICK G. FOLBERTH
& WILLIAM M. FOLBERTH
BY
Richey & Watts
ATTORNEYS

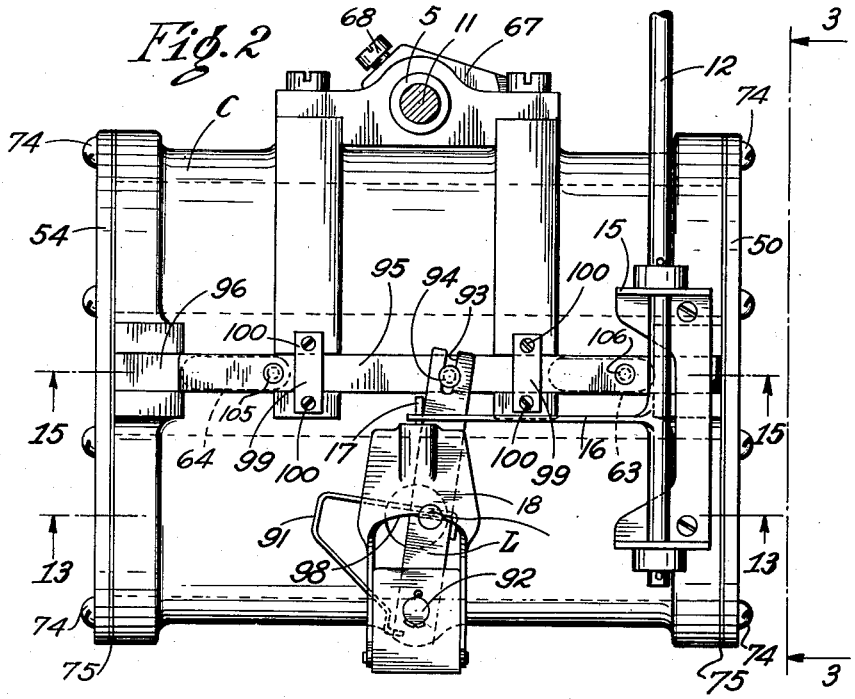
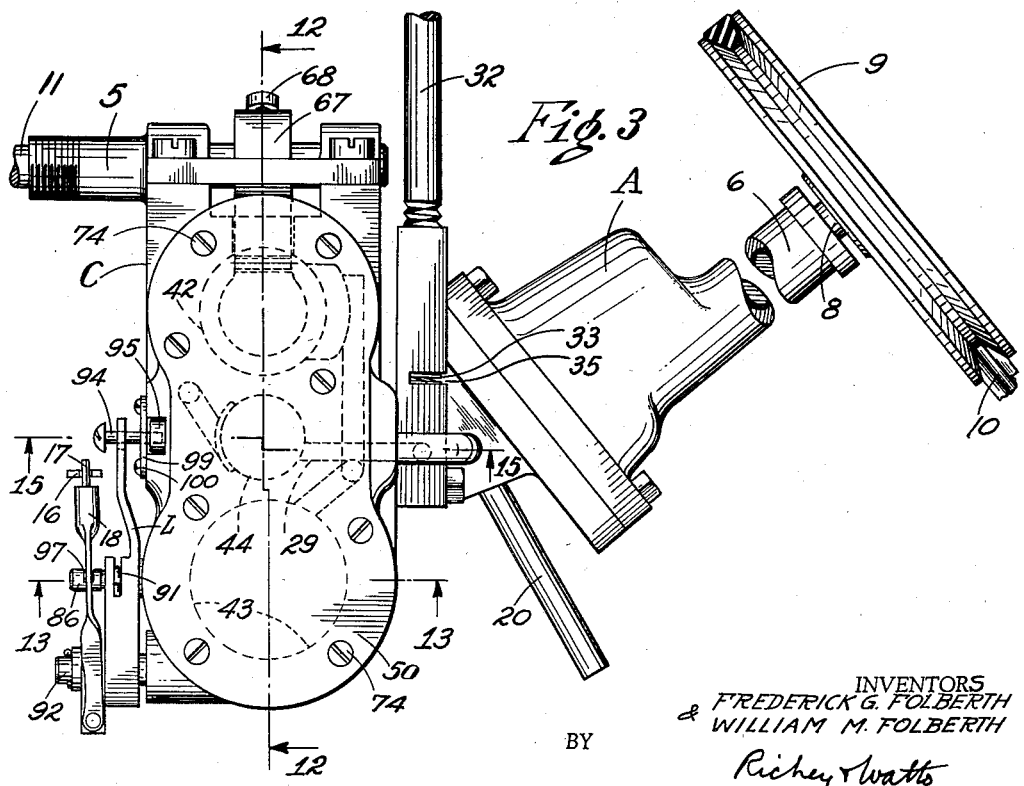

March 7, 1944. F. G. FOLBERTH ET AL 2,343,656
FLUID PRESSURE ACTUATED MOTOR
Filed March 6, 1941 7 Sheets-Sheet 3
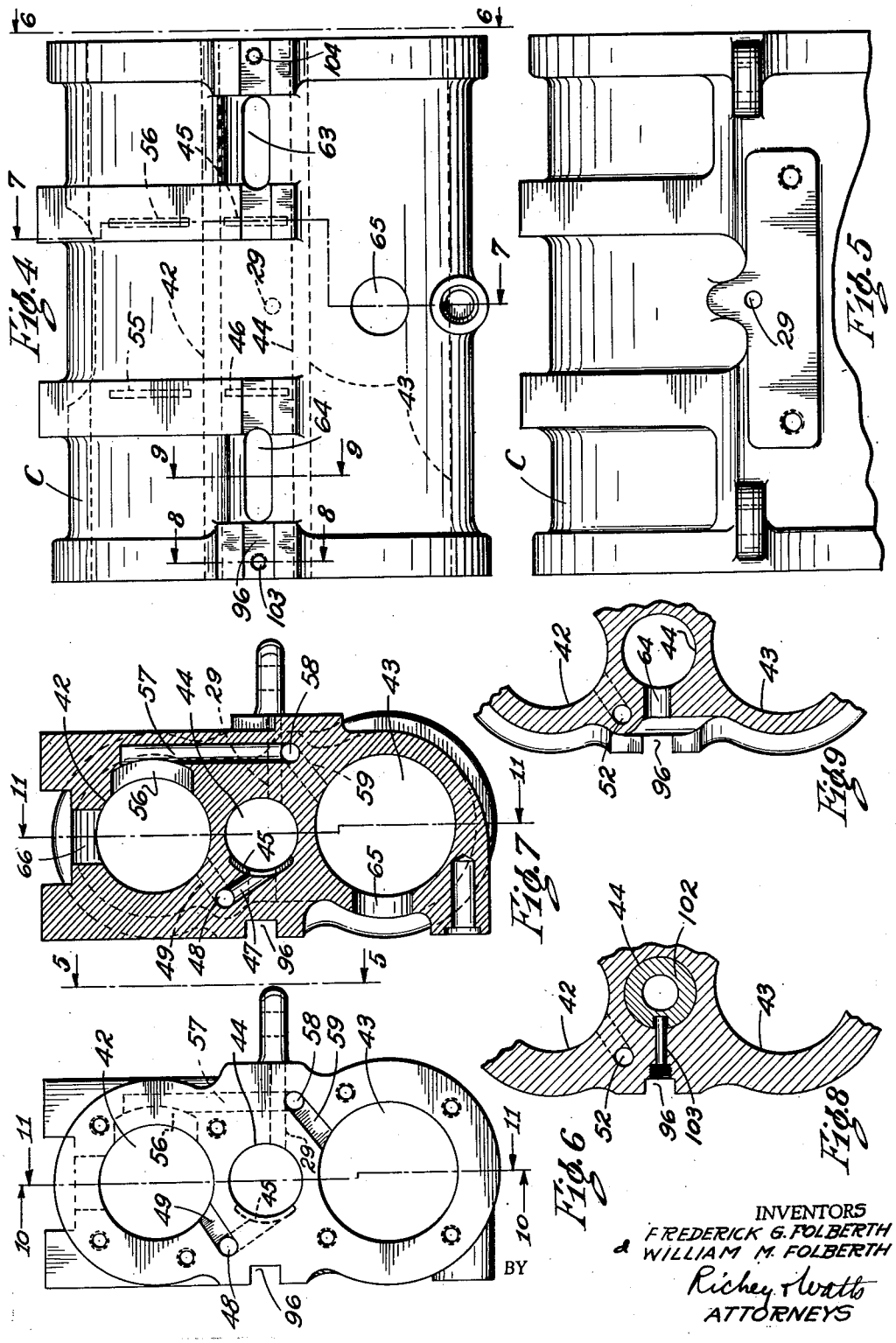
INVENTORS
FREDERICK G. FOLBERTH
& WILLIAM M. FOLBERTH
BY Richey Watts
ATTORNEYS March 7, 1944.  F. G. FOLBERTH ET AL  2,343,656
FLUID PRESSURE ACTUATED MOTOR
Filed March 6, 1941  7 Sheets-Sheet 4
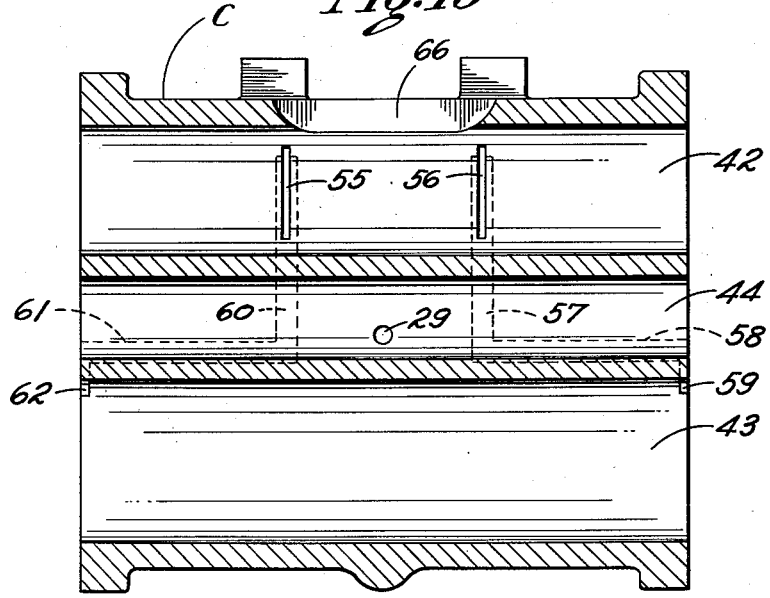
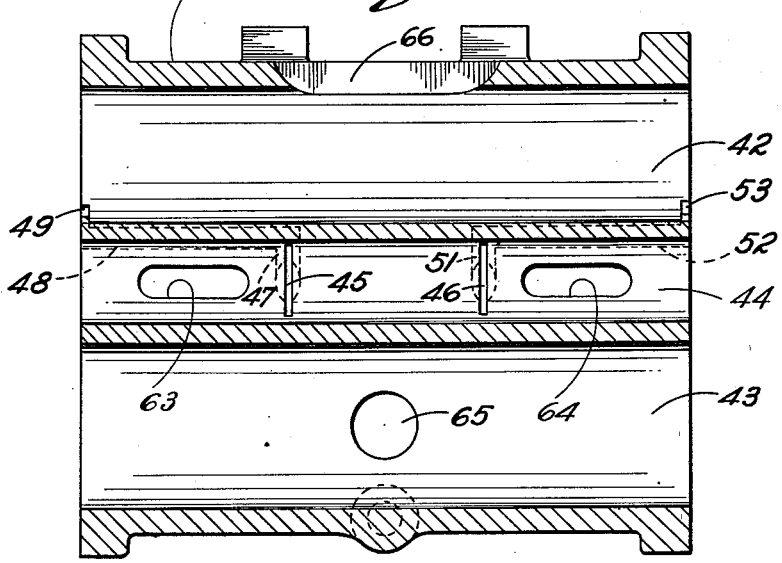
INVENTORS
FREDERICK G. FOLBERTH
& WILLIAM M. FOLBERTH
BY
Richey & Watts
ATTORNEYS

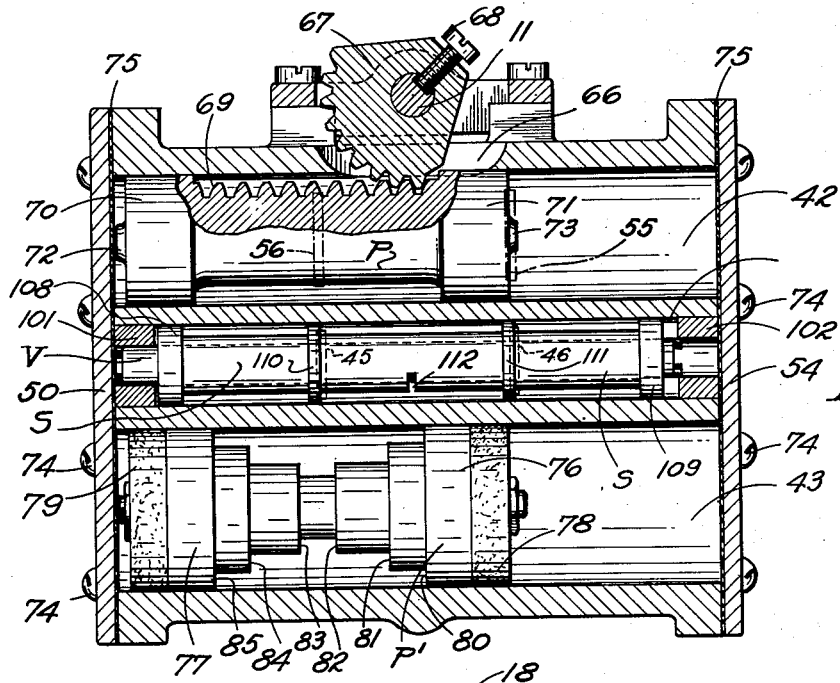

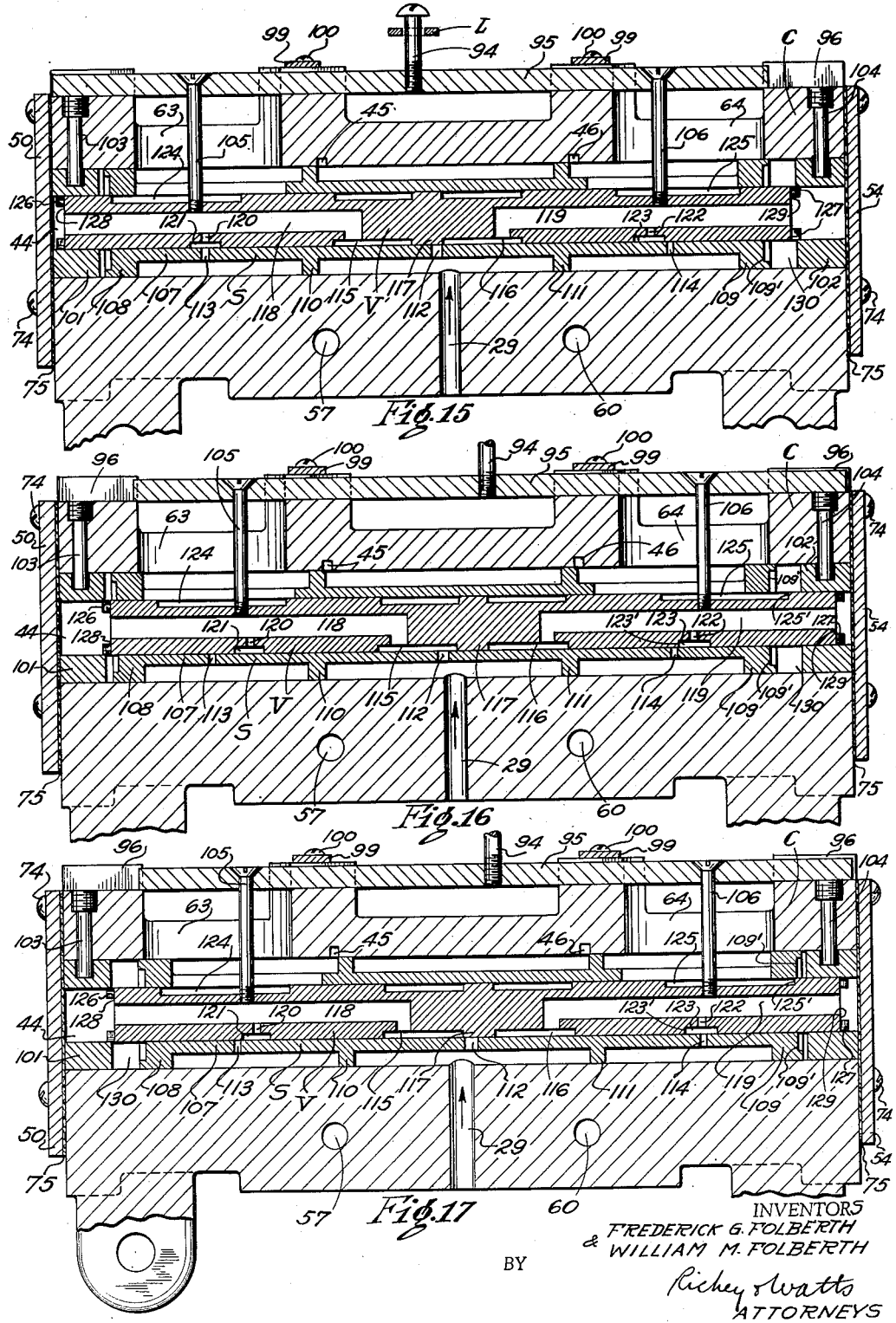

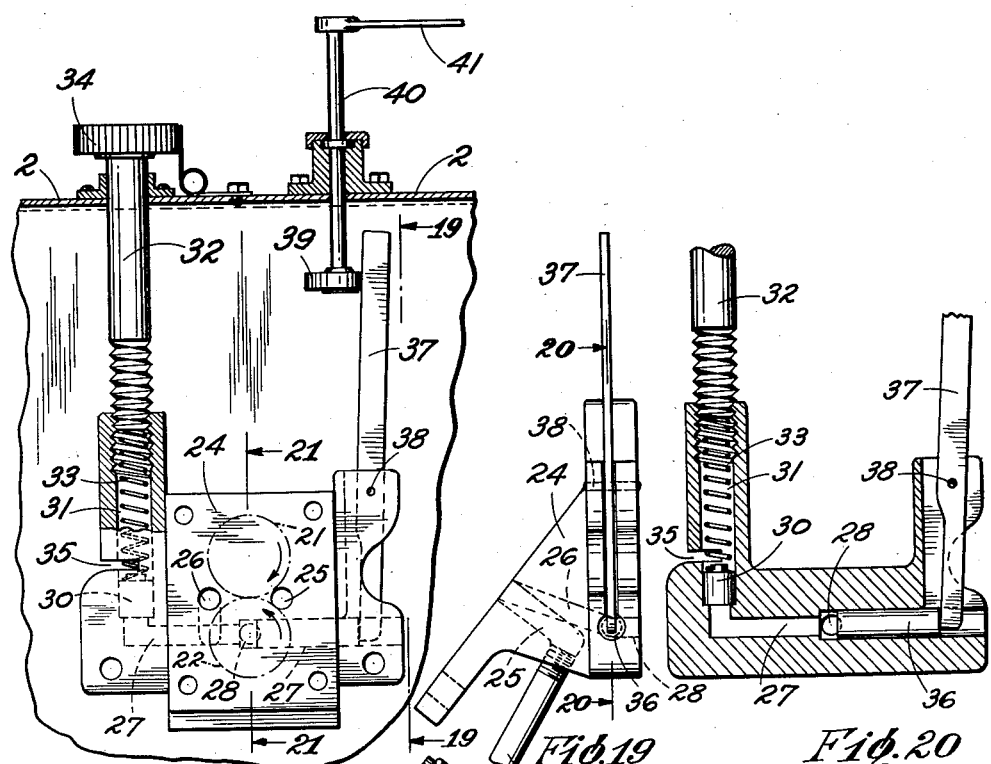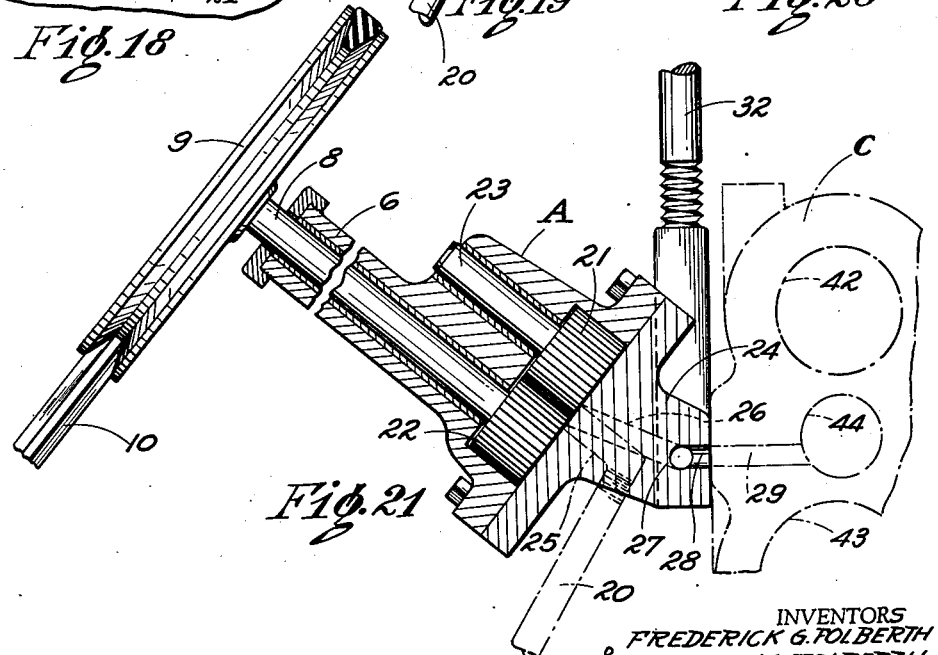

Patented Mar. 7, 1944

2,343,656

UNITED STATES PATENT OFFICE 2,343,656

FLUID PRESSURE ACTUATED MOTOR

Frederick G. Folberth and William M. Folberth, Cleveland, Ohio

Application March 6, 1941, Serial No. 382,040

13 Claims. (Cl. 15—253)

This invention relates to fluid pressure actuated motors and more particularly to an improved means for driving windshield cleaners or the like on vehicles, such as automobiles, airplanes, etc.

The great majority of windshield wipers in use today are operated by vacuum actuated motors which impart an oscillating motion to a shaft which in turn drives the windshield cleaner arm. The rate of the reciprocation of these motors is usually adjustable to a certain extent whereby the speed of travel of the cleaner blade can be regulated. However, mere variation in the speed of travel does not effectively take care of all conditions under which the cleaner must operate. For example, when a very light rain or mist is falling it frequently occurs that, regardless of how slowly the blade is moved over the glass, sufficient moisture does not collect between strokes to enable the squeegee to clean the windshield properly. The mechanism of our present invention overcomes this difficulty by providing a motor which will drive the cleaner blade in such a manner that it will stop and wait for a predetermined time interval at each end of its cleaning stroke. This time interval is variable to suit varying conditions encountered and enables an extremely efficient cleaning action to be obtained at all times.

Another objection to the usual vacuum operated windshield cleaner motor is that its power is relatively small and varies with the conditions under which the vehicle engine is operating. Thus, upon opening the throttle, the intake manifold vacuum is reduced and the motor slows down or stops until proper vacuum conditions are restored in the manifold. Due to the relatively small power output of the vacuum motor under such conditions, the pressure of the squeegee blade against the glass must be made relatively light in order to give any cleaning action at all. Such light pressure, however, is not effective to remove heavy snow and sleet and does not give the most perfect cleaning under any conditions.

It is among the objects of our present invention to provide a fluid pressure actuated motor, especially adapted for operating windshield cleaners, which will give a substantially constant power output regardless of variations in vehicle speed or engine operating conditions, which power output is sufficient to enable a relatively high squeegee pressure to be maintained against the windshield at all times. Other objects of our invention are: the provision of a windshield cleaner motor which will permit of an adjustable lag or wait at a point in the oscillating stroke of the motor and cleaner arm connected thereto; the provision of a windshield cleaner motor which derives its operating force from oil or other liquid under pressure and in which the necessity for pressure conducting pipes, with the possibility of leaky connections, is completely eliminated; the provision of an oil or other liquid operated motor of the type described which is entirely self contained in a liquid tight housing; the provision of a fluid pressure actuated motor which will operate at substantially constant speed regardless of considerable variations in pressure of liquid supplied by the pump; the provision of means for controlling a fluid pressure motor of the type described whereby the lag or wait at each end of the stroke of the motor may be varied through a series of steps at the will of the operator; the provision of an extremely compact windshield cleaner operating unit which will deliver sufficient power to the cleaner under all conditions to enable relatively high squeegee pressure to be maintained against the glass; the provision of a fluid pressure actuated motor having a valve mechanism which is self starting and which will operate effectively regardless of substantial variations in the viscosity of the actuating fluid; the provision of a self lubricating, quiet and efficient windshield cleaner motor which may be driven by any suitable connections from the prime mover of the vehicle on which the motor is installed or by independent means if desired.

The above and other objects of our invention will appear from the following description of one embodiment thereof, reference being had to the accompanying drawings, in which—

Figure 1 is an elevational assembly view, partly in section, of our improved motor, pump, control mechanism and enclosing structure therefor.

Figure 2 is a detached side elevation of the fluid pressure motor taken on the front or drive side thereof.

Figure 3 is an end elevation of the device shown in Figure 2, taken substantially on line 3—3 of Figure 2.

Figure 4 is a detached front elevation of the main motor casting.

Figure 5 is a fragmentary rear elevation of the casting shown in Figure 4, taken on line 5—5 of Figure 6.

Figure 6 is an end elevation of the motor casting taken on line 6—6 of Figure 4.

Figure 7 is a vertical sectional view taken on line 7—7 of Figure 4.

Figure 8 is a fragmentary vertical cross sectional view taken on line 8—8 of Figure 4.

Figure 9 is a fragmentary vertical cross sectional view taken on line 9—9 of Figure 4.

Figure 10 is a longitudinal cross sectional view taken on line 10—10 of Figure 6.

Figure 11 is a view similar to Figure 10 but looking in the opposite direction and taken on line 11—11 of Figure 6.

Figure 12 is a vertical cross sectional view taken on line 12—12 of Figure 3 and showing one position of the parts when the motor is set for maximum delay between strokes.

Figure 13 is a horizontal cross sectional view taken on line 13—13 of Figure 3 showing the delay control mechanism set to permit maximum delay.

Figure 14 is a view generally similar to Figure 13 but showing the delay control mechanism set to produce minimum delay between wiper blade strokes.

Figure 15 is an enlarged horizontal cross sectional view taken on line 15—15 of Figure 3 and illustrating the control valve apparatus and its associated parts in position at one end of the valve movement corresponding to the position shown in Figure 12.

Figure 16 is a view generally similar to Figure 15 but illustrating the valve parts in the positions they assume when the internal or pilot valve has been moved but before the main sleeve valve is moved.

Figure 17 is a view similar to Figures 15 and 16 but illustrating the parts in their opposite extreme positions from those shown in Figure 15.

Figure 18 is a fragmentary view of the pressure control and adjusting means of our windshield drive mechanism.

Figure 19 is a detached side view of the pump supporting bracket and speed control lever taken on line 19—19 of 18.

Figure 20 is a vertical sectional view taken on line 20—20 of Figure 19.

Figure 21 is a vertical cross sectional view taken on line 21—21 of Figure 18 but illustrating the pump in operating position.

Referring now to Figure 1, our improved drive unit for windshield wipers or the like includes a tank or casing 1 having a removable cover plate 2. The motor unit proper is indicated generally at M and is supported in the housing 1 by clamp nuts 3 and 4 on the wiper drive shaft bearing housing 5 and by engagement of the pump shaft housing 6 with the portion 7 of the casing. The pump which supplies liquid under pressure to the motor M is indicated in general at A and is mounted on and connected to the motor as will appear later. The drive shaft 8 of the pump extends through the shaft housing 6 and carries a pulley 9 at its upper end. The drive belt 10 may be connected to any suitable source of power through any suitable means. Preferably the pump shaft 8 is connected to be driven by the engine of the automotive vehicle on which the device is installed and a clutch of any suitable type (not shown) may be installed in the drive connection to permit starting and stopping of the motor M at the will of the operator.

The wiper operating shaft 11 extends through the bushing or sleeve 5 which passes through the wall of the tank 1 and which is held in place by nuts 3 and 4 and suitable washers to prevent leakage. As will appear later, the operating shaft 11 is given an oscillating motion by motor M and it will be understood by those skilled in the art that this motion will be transmitted either directly to the windshield wiper squeegee blade B, which engages the windshield W, or suitable linkage may be utilized to operate one or more blades simultaneously.

The tank or housing 1 and its associated parts may be located any convenient place on the vehicle and the driving connection from the operating shaft 11 may be any suitable means which will connect the shaft 11 to the windshield wiper arm or arms. Such connections are not shown herewith as they do not form a part of the present invention.

Extending through the top of the tank 1 is a lag or delay control rod 12. The upper end of this rod 12 is provided with a lever arm 13 to which is pivotally connected the operating link 14 which leads to a place convenient to the vehicle operator. The lower end of the lag control rod 12 is supported in a bracket 15 and provided with a horizontally extending operating arm 16 which in turn is pivotally attached to the pin 17 on the yoke lever 18. As will be explained more fully later, rotation of the delay control rod 12 will shift the mechanism which determines the time lag or delay at the end of each stroke of the wiper blade from one to another of its several positions.

In operation, the tank 1 is filled with oil or other suitable liquid, preferably about to the level indicated at 19 in Figure 1 as the pump inlet is through a tube 20 extending downwardly into the tank 1 from the pump A. The lower end of inlet 20 is at all times completely submerged and a continuous supply of fluid for the pump is thus assured.

Though any suitable type of pump may be employed, we have illustrated, and prefer to use, a gear type pump comprising a pair of gears 21 and 22, the shaft 8 carrying the gear 22 and the gear 21 being mounted on an idler shaft (see Figure 21). The pump A is secured to a connecting bracket 24 which in turn is attached to the main pump casting C. As is best seen in Figures 18 to 21 inclusive, the pump inlet tube 20 conducts liquid to a passage 25 in the bracket 24. This passage 25 leads to the inlet side of the pump A and another passage 26 leads from the pump A to a transverse passage 27 in the pump supporting bracket 24. From the passage 27 another passage 28 leads to the inlet passage 29 in the main pump casting C.

In order to control the pressure of the oil delivered to the pump through the passage 29 we provide a pressure relief valve which includes a spring backed plunger 30 disposed in a cylinder 31 which extends vertically from one end of the passage 27. An adjusting screw 32 regulates the pressure exerted by the spring 33 on the plunger 30 and this screw 32 preferably extends out through the cover 2 of the housing and is provided with a knurled adjusting knob 34, whereby the spring load on the plunger 30 may be adjusted from the outside of the casing 1. A relief port 35 is formed in the bracket 24 and connects with the cylinder 31. Thus when the pressure delivered by the pump A to the passage 27 and to the motor M, exceeds a predetermined value, the plunger 30 will be lifted from the position shown in Figure 20 until oil is permitted to escape through the port 35. Thus the plunger 30 and its adjustable spring 33 provide means for regulating the pressure supply to the motor M.

In addition to the above described automatic pressure control, throttle means are provided for restricting the flow of oil to the motor M. This includes a plunger 36 which is slidable in the passage 27 and a pivoted lever 37, the lower end of which engages the plunger 36 and which is pivotally mounted on bracket 24 at 38. The upper end of lever 37 is engaged by a cam 39 secured to a vertical shaft 40 which extends through the top 2 of the enclosed casing (see Figures 18, 19 and 20). An operating lever 41 is connected to the shaft 40 and suitable connections may lead from this lever to the driver's position of the vehicle so that the operator may adjust the position of the end of the plunger 36 relative to the passage 28 which leads to the motor. By operating the lever 37 to move the plunger 36 to the left (see Figure 20) the opening 28 may be restricted and consequently the speed of operation of the motor may be reduced. Such throttling of the oil inlet to the motor may result in discharging oil through the relief port 35 but in such event the so discharged oil will immediately pass back into the tank or the enclosing fixture 1 and will re-circulate through pump A.

By the above described arrangement of fluid pump and controls we are able to deliver the operating fluid to the motor M at the desired rate and under the desired pressure. Both the rate and pressure may be varied from outside of the tank 1 and thus a simple and flexible control is provided and, although the speed at which the pump A is driven may vary through a wide range, particularly if the pump is driven directly from the vehicle engine, still a substantial constant pressure will be supplied to the motor M and it will operate at a substantially constant speed regardless of fluctuation in the speed of the vehicle or its engine.

The structure of the motor will now be described, reference being had particularly to Figures 2 to 17 inclusive.

The main motor casting is indicated generally at C and is illustrated in detail in Figures 4 to 9 inclusive. In the upper part of the casting C is the main drive chamber or cylinder 42 and in the lower part is the valve actuating or delay chamber or cylinder 43. Between the two cylinders 42 and 43 is the valve chamber 44 and it will be observed from Figures 7 and 10 that the oil inlet passage 29 leads to the valve chamber 44.

Oil is conducted from the valve chamber 44 to the drive cylinder 42 through the slots or grooves 45 and 46. Groove 45 is connected to a passage 47 which in turn connects to a passage 48 extending to the end of the casting. A recess 49 is formed in the end of the casting and cooperates with the end cover plate 50 to complete the fluid connection from the groove 45 to one end of the drive cylinder 42.

In like manner the groove 46 is connected to the other end of the drive cylinder 42 through passages 51 and 52 and recess 53 which is covered by the end plate 54 to complete the connection to the cylinder 42.

As will appear more fully later, oil which enters the cylinder 42 passes down into the delay cylinder 43 when the piston reaches the end of its stroke and to deliver oil from cylinder 42 to 43 slots 55 and 56 (see Figures 7 and 10) are spaced equally from the opposite ends of the cylinder. Slot 56 connects to a vertical passage 57 which in turn connects to a horizontally extending passage 58. A groove or recess 59 in the end of the casting C completes the passage to the cylinder 43 when the end cover plate is in position. In like manner a vertical passage 60 connects the slot 55 to a horizontal passage 61 which terminates in the recess 62 connecting to the opposite end of the delay cylinder 43.

Elongated slots 63 and 64 extend through the wall of the casting into the valve chamber 44 on the side of the casting opposite the inlet passage 29. On this same side of the casting, which will be termed the "front" of the casting in this description, is a hole 65 which extends into the center of the valve actuating or delay cylinder 43 and a slotted aperture 66 which extends into the top of the drive cylinder 42 and, as is best seen in Figure 12, accommodates the gear segment 67 which is secured to the wiper drive shaft 11 by means of a set screw 68. The teeth of the segment 67 engage a rack 69 formed on the connecting portion of the double ended main drive piston P. This piston P is seen in Figure 12 and it will be observed that it has opposite head portions 70 and 71, each of which is provided with a projecting boss 72 and 73 respectively. As the piston oscillates in the cylinder 42 a corresponding oscillating movement will be imparted to the segment 67 and the shaft 11. The end cover plates 50 and 54 are secured to the main casting by screws 74 and are preferably provided with suitable gaskets 75 to prevent leakage.

Referring particularly to Figures 12, 13 and 14, the valve actuating or delay piston P' is positioned to reciprocate in the delay cylinder 43 and comprises similar end portions 76 and 77, preferably fitted with leather packing seen at 78 and 79. The connecting portion of the piston P' consists of a series of graduated steps having vertical face portions (80, 81, 82, 83, 84 and 85). As will appear more fully later, the length of the delay between strokes of the drive member or piston P is determined by the length of travel of the delay member or piston P'.

Thus, to control the length of the time delay between the strokes of the wiper blade, a stop pin 86 is provided operating in a sleeve 87 which is carried by, and forms a part of, the valve operating lever L. The pin 86 is provided with spaced grooves (88, 89 and 90) and a spring wire 91 is adapted resiliently to engage any selected one of these notches or grooves and retain the pin 86 in the desired position. When in its completely retracted position (Figure 13) the pin 86 is not engaged by the flanges (81, 82, 83 or 84) but the flanges (80 and 85) do engage the sleeve 87 to actuate the valve shifting lever L. When, however, the pin 86 is moved inwardly by turning the shaft 12 (Figure 1), as previously explained, until the spring 91 engages the groove 88, the pin 86 will lie in the portion of the piston P' of smallest diameter and will be engaged by the faces 82 and 83 (see Figure 14). When in this position only a very short movement of the delay piston P' will occur in either direction before the valve is shifted to reverse the movement of the drive piston P.

Although only three positions are shown for the pin 86 and only three sets of engaged faces on the piston P' are indicated, it will be understood that any desired number of steps may be formed on the piston P' or it may be made with uniformly tapering portions so that an infinite number of adjustments may be obtained for the time lag at the end of each stroke of the piston P and the wiper blade.

The lever L, the lower end of which is engaged by and actuated by piston P', is clearly seen in Figures 2 and 3, and it is pivotally mounted on a shaft 92 secured in and projecting out from the front of the casting C. The upper end of the lever L is slotted at 93 and fits over a pin 94 projecting out from the valve operating bar 95. The casting C is grooved at spaced intervals indicated at 96 to provide support for the bar 95 whereby it may slide in a direction parallel to the movement of the pistons P and P'. When in operating position the bar 95 is generally in alignment with the slotted openings 63 and 64 but is spaced therefrom so as not to interfere with discharge of oil through these slots. The outer end of pin 86 is grooved as seen at 97 and the curved part 98 of the yoke lever 18 fits into the notch 97. Thus the lever L, which carries the pin 86 is permitted to swing about its pivotal support 92 while retaining at all times an operating connection between the yoke lever 18 and the pin 86. By means of this arrangement the pin 86 can be shifted from one position to another during operation of the motor and without interfering in any way with such operation. Straps 99 are secured to the casting C by screws 100 and serve to retain the valve operating bar 94 in position in the slots 96 while permitting free longitudinal sliding movement thereof.

In Figures 15, 16 and 17 we have illustrated in several positions the valve mechanism which controls the operation of the piston P. Broadly speaking, the valve comprises two elements—an internal or pilot valve generally indicated at V and a main or sleeve valve S. The sleeve valve S has a series of flanges which have a close sliding fit within the valve cylinder 44, and the pilot valve V has a sliding fit within the bore of the sleeve valve S. At the ends of the valve cylinder 44 are ring members 101 and 102. These are held in place by pins 103 and 104 respectively which have threaded engagement at their outer ends with the casting C. These rings 101 and 102 in effect form restrictions at the ends of the valve cylinder 44. They are made removable and secured in place by the pins 103 and 104 in order to facilitate assembly and to permit the valve members V and S to be inserted into the casting C.

As seen in Figure 15 the opening in the sleeves 101 and 102 is of a diameter to permit sliding movement of the ends of the pilot valve V therein. In order to move the pilot valve V connections are made to the valve operating bar 95 by means of the screw pins 105 and 106 which pass through slots 63 and 64 in casting C and through suitable apertures in the bar 95 and have threaded engagement with the wall of the pilot valve V. Thus sliding movement of the bar 95 in its guide slots 96 will cause corresponding sliding movement of the pilot valve V and rotary movement of the pilot valve V will be prevented due to the connection to the bar 95 through the screw pins 105 and 106.

The main sliding sleeve valve S comprises a generally tubular body 107 having annular end flanges 108 and 109 and annular intermediate flanges 110 and 111. An oil inlet 112 extends through the wall 107 substantially midway between the intermediate flanges 110 and 111 and oil outlet openings 113 and 114 are provided between end flanges and the intermediate flanges.

The pilot valve V has cutaway portions 115 and 116 on either side of a central web 117. From the recess 115 a passage 118 extends to the left hand end and a corresponding passage 119 extends from the cutaway portion or recess 116 to the opposite end of the pilot valve. A hole 120 and a flat spot 121 is adapted to connect the aperture 118 to the hole 113 in the main valve S and in similar manner a hole 122 and flattened portion 123 connects the passage 119 to the hole 114 in the main valve under certain conditions. A recess or flat spot 124 is formed on the side of the pilot valve V adjacent the pin 105 and a similar recess 125 is formed by flattening the valve V adjacent the pin 106. Spaced lugs 126 and 127 project from the opposite ends of the pilot valve V, the outer surface of these lugs being shaped to conform to the outer diameter of the valve V. These lugs serve to maintain engagement with the sleeves 101 and 102 when the pilot valve is at the ends of its stroke although the end faces 128 and 129 of the valve V move slightly away from the inner faces of the sleeves 101 and 102 for purposes which will be later explained.

The operation of the valve mechanism will now be described.

In Figures 12 and 15 the corresponding parts of the motor M are shown in the same positions and it will be noted that the drive piston P is at the left hand end of its stroke and the pilot valve V and valve S are also in their extreme left hand positions. Referring to Figure 15, oil under pressure will flow from the pump A through the passage 29 into the space surrounding the valve S between the flanges 110 and 111. This oil will pass out through the slot 45, the slot 46 being shut off by the flange 111. From the slot 45 the oil, or other suitable fluid, moves through passages 47, 48 and 49 into the left hand end of the drive cylinder 42 causing the piston P to move to the right. During this movement of piston P the valve parts remain stationary and the segment 67 and wiper drive shaft 111 are rotated in counterclockwise direction (see Figure 12). As soon as the left hand end of the piston head 70 reaches the slot 56 (indicated in dot and dash lines in Figure 12) the oil under pressure will flow through the slot 56, passages 57, 58 and 59 to the left hand end of the delay cylinder 43. The piston P will stop moving to the right as soon as port 56 is exposed and oil will continue to flow through the slot 56 and its connecting passage down into the cylinder 43 with resulting movement of the delay piston P' to the right from the position shown in Figure 12.

The delay piston continues its movement to the right until one of the shoulders 83, 84 or 85 engages the valve operating mechanism and shifts the pilot valve V. During this travel of the delay piston P' no movement of the other parts will take place and the piston P and the valve parts will remain stationary. Assuming that the plunger 86 is withdrawn as shown in Figure 13 to give the maximum delay, the pilot valve V will not be moved until the flange 85 strikes the sleeve 87 and swings the valve operating lever L about its pivot. This movement of the lever L is transmitted to the pilot valve V through the pin 94, sliding bar 95 and connecting screws 105 and 106. When the pilot valve V has been moved to the right into the position shown in Figure 16, oil under pressure is permitted to enter through the hole 112 and passage 118 into the space within the sleeve 101.

It will be seen that the flange 111 on the pilot valve V will open the hole 112 to the passage 118 before the pilot valve V reaches the end of its stroke. Thus oil under pressure will be supplied to the left hand end of the pilot valve V to exert a pressure tending to move the valve to the right. This greatly reduces the load on the valve operating mechanism and all that the operating lever L has to do is to start the valve V on its travel and then, as soon as the hole 112 is open to the passage 118, the oil pressure will continue the movement of the valve V to the right. This movement is permitted even though the right hand end of valve V is moving into the sleeve 102 because oil which has been trapped in the sleeve 102 may escape through the passage 119, hole 122, flat spot 123 and hole 114 into the space around the main valve S between the intermediate flange 111 and the end flange 109. As this space is always open to the interior of the tank 1 through the slot 64, the oil freely escapes into the reservoir and no resistance is offered to movement of the valve V to the right until the inner edge 123' of flat spot 123 moves beyond hole 114 (see Fig. 16). When this occurs no more fluid can escape from sleeve 102 and an oil cushion is formed which stops the valve V before it strikes the cover plate 54.

As soon as the end face 128 of valve V clears the inner face of the sleeve 101 (seen in Figure 16) oil under pressure which escapes around the projecting lugs 126 will be effective against the end of the flange 108 and will move the main valve S to the right from the position shown in Figures 15 and 16 into position shown in Figure 17. This shift of the main valve S changes the connection of the oil inlet 29 from the slot 45 to the slot 46. As may be seen in Figure 11, the slot 46 leads to the right hand end of the drive cylinder 42 through passages 51, 52, and 53 and, as the drive piston P is now at right hand end of the cylinder 42, this shift in connections will cause oil under pressure to be supplied to the right hand end of the cylinder 42 starting the piston P moving back towards the left. During this movement of the piston P the oil which is contained in the left hand end of the cylinder 42 will be discharged through the passages 49, 48, 47, and slot 45 into the space between the end flange 108 and intermediate flange 110 of the main valve S. As this space is at all times connected to the elongated slot 63 which leads directly into the tank 1 the oil from the discharged end of cylinder 42 is freely discharged into the reservoir.

Referring particularly to Figure 16 it will be seen that after the pilot valve V is moved to the right the main valve S starts to move. The space 130 between the end of the flange 109 and the face of the sleeve 102 will be full of oil and this oil may escape through the slot 125 and out into the reservoir 1 through the slot 64. This escape of oil will continue until the end face 109' of the valve S overlaps the end 125' of the recess 125 (Figure 17). When this overlapping occurs no more oil can escape from the space 130 and the parts are so proportioned that this closing off of the exhaust from the space 130 occurs before the end of the valve S strikes the end of the sleeve 102. This is clearly shown in Figure 17 and this arrangement provides a cushion at each end of the stroke of the valve S preventing impact of the valve against the sleeves 101 or 102. A very silent and effective operation is thus obtained so both valve members V and S are so cushioned that they do not strike the ends of the housing.

As best seen in Figures 15 and 17, when the valve parts are in either of their extreme end positions the flange 117 on valve V just closes the hole 112 through sleeve S. Thus fluid pressure is shut off from the end of valve V toward which the next movement occurs and resistance to its movement by lever L is avoided. However, if desired flange 117 may be made shorter so that an initial resistance is imposed on valve V.

From the above description it will be seen that the cycle of operation of our apparatus, starting from the position shown in Figure 12, is as follows: First, the piston P moves to the right until the port 56 is exposed, whereupon oil passes from the cylinder 42 through the port 56 and connecting passages to the left hand end of delay cylinder 43. This discharge of oil into cylinder 43 continues until the delay piston P' is moved to the right a distance sufficient to cause one of the flanges thereon (depending on the setting of pin 86) to engage and start to switch over the valve operating lever L. When the valve lever L is moved the pilot valve V is shifted. This shift of the pilot valve is assisted by oil pressure on the end of the pilot valve and as soon as it is moved to its other position oil under pressure is released against the end of the main sleeve valve S, shifting the sleeve valve and reversing the connections from the pump to the main drive cylinder 42. Upon such reversal the drive piston P moves to the left back into its original position and the delay cycle again occurs during which time the delay cylinder is filled with oil to a certain degree before the valve mechanism is again shifted. This operation continues as long as the pump A supplies fluid under pressure through inlet 29.

By means of our improved construction springs for operating the valve mechanism are completely eliminated. Mechanical shifting of the valve is necessary only in a small degree. With the full oil pressure being available to effect the major portion of the valve movements, an adjustable wait or delay may be obtained at a predetermined point in the stroke of the wiper blades. This may be varied from a wait of substantial length of time, for example one-half minute, down to substantially no delay at all when the regulating plunger 86 is in position shown in Figure 14. Under conditions of a very light drizzle or when driving on wet pavement behind other vehicles which throw up a fine mist, the delay is preferably set for maximum duration, thus permitting enough moisture to collect on the windshield between blade strokes to permit effective cleaning. When heavy rain is falling the plunger 87 is adjusted to cause the wiper blade to operate continuously without delay at the ends of its stroke. By employing hydraulic pressure and by making the pump A of a capacity sufficient to drive the motor at its desired speed under idling conditions of the vehicle engine, a uniform cleaner operation can be obtained throughout substantially the entire speed range of the vehicle.

It will be understood by those skilled in the art that under some circumstances different types of valve mechanisms may be employed for supplying fluid under pressure to the cylinder 42. With such modified valve structures the advantages of the lag or delay at the ends of the driving piston stroke will still be obtained and the operation of the delay mechanism, etc., will be substantially as described.

The pump A is preferably designed so that, even at its lowest rate of speed there is an overflow of oil through the safety valve 30. And thus, at any higher speed than this predetermined low value, the pressure will be maintained substantially constant and operation of the motor M will not vary to a substantial or material degree.

Although we have described the illustrated embodiment of our invention in considerable detail, it will be understood by those skilled in the art that numerous variations and modifications may be made in the specific form of apparatus employed to carry out our invention. We do not therefore wish to be limited to the exact mechanism herein shown and described but claim for our invention all embodiments thereof coming within the scope of the appended claims.

We claim:

1. In a fluid pressure actuated motor of the type described, a main cylinder, a drive piston in said main cylinder, a delay cylinder, a delay piston in said delay cylinder, means, including a valve, for supplying fluid under pressure to said main cylinder, a pair of fluid conducting connections extending from said main cylinder to said delay cylinder, the main cylinder end of one of said connections being positioned to be closed by said drive piston except when said drive piston is at one end of its stroke and the main cylinder end of the other of said connections being positioned to be closed by said drive piston except when it is at the other end of its stroke, and means, including a pilot valve mechanically actuated through a lost motion connection by movement of said delay piston, for operating said valve to impart reciprocating motion to said drive piston.

2. In a fluid pressure actuated motor of the type described, a main cylinder, a drive piston in said main cylinder, a delay cylinder, a delay piston in said delay cylinder, means, including a valve, for supplying fluid under pressure to said main cylinder, a pair of fluid conducting connections from said main cylinder to said delay cylinder, one of said connections being positioned to be closed by said drive piston except when said drive piston is at one end of its stroke and the other of said connections being positioned to be closed by said drive piston except when it is at the other end of its stroke, means, including a pilot valve actuated by movement of said delay piston through an adjustable mechanical connection, for operating said valve to impart reciprocating motion to said drive piston, a source of supply of fluid under pressure, means for conducting fluid under pressure from said source to said valve, and pressure regulating means between said source and said valve whereby the maximum pressure delivered to said valve will be maintained below a predetermined value.

3. In apparatus of the type described, a main cylinder, a drive piston adapted to reciprocate in said main cylinder, fluid pressure conducting connections leading to the opposite ends of said cylinder, a delay cylinder, fluid conducting passages from said main cylinder to said delay cylinder, a delay piston in said delay cylinder, said fluid conducting passages opening into said main cylinder at spaced points whereby one of said passages will be exposed by said main piston at one end of its travel and the other passage exposed at the other end of said main piston travel, and valve means, including a valve, and a pilot valve operable by said delay piston through an adjustable mechanical connection, for controlling said fluid pressure connections to said main cylinder to cause reciprocation of said main piston therein.

4. In a fluid pressure actuated motor of the type described, a housing having formed therein a main chamber, a delay chamber and a valve chamber, a drive member in said main chamber movable between two extreme positions, a movable delay member in said delay chamber, fluid pressure conducting connections from said valve chamber to said main chamber, fluid pressure conducting connections from said main chamber to said delay chamber connecting said delay chamber to a source of fluid pressure through said main chamber when said drive member is at one of its extreme positions to thereby move said delay member, a fluid inlet to said valve chamber, a valve in said valve chamber adapted to control the fluid connections from said inlet to said main chamber and from said main chamber to exhaust, and means actuated by said delay member after a predetermined movement thereof for operating said valve to reverse the direction of movement of said drive member after an appreciable period of delay at said extreme position.

5. In a fluid pressure actuated motor of the type described, a cylinder, a piston in said cylinder, means for discharging fluid under pressure into one end of said cylinder to move said piston therein, a port in said cylinder positioned to be exposed by said piston when said piston reaches a predetermined position in said cylinder, a delay chamber, fluid connections from said port to said delay chamber whereby, when said piston is in said predetermined position, fluid discharged into said cylinder will pass on into said delay chamber, a movable member in said chamber adapted to be moved by fluid entering said chamber, valve means for controlling the flow of fluid to said end of said cylinder, and means, mechanically operated by said movable member after a predetermined movement thereof, for actuating said valve means to stop the flow of fluid into said end of said cylinder.

6. In combination in a fluid pressure motor of the type described having a main cylinder, a piston in said cylinder, and a valve for controlling the flow of actuating fluid to and from said cylinder; a delay cylinder, a delay piston in said delay cylinder, fluid conducting connections from said main cylinder directly to said delay cylinder, whereby fluid flows to said delay cylinder only at the ends of the stroke of said main piston, mechanical valve actuating means adapted to be operated by movement of said delay piston, and means for varying the stroke of said delay piston in said delay cylinder whereby the time which elapses between successive operations of said valve may be varied.

7. In combination in a fluid pressure motor of the type described having a main cylinder, a piston in said cylinder, and a valve for controlling the flow of actuating fluid to and from said cylinder; a delay cylinder, a delay piston in said delay cylinder, fluid conducting connections from the intermediate portions of said main cylinder to the end portions of said delay cylinder, valve actuating means adapted to be operated by movement of said delay piston, connections between said valve and said valve actuating means, and means for varying the stroke of said delay piston in said delay cylinder whereby the time which elapses between successive operations of said valve may be varied, said stroke varying means including a series of shoulders formed on said delay piston and an adjustable plunger connected to said valve actuating means and adapted to be engaged by different pairs of said shoulders when in different positions.

8. In combination in a fluid pressure motor of the type described having a main cylinder, a piston in said cylinder, and a valve for controlling the flow of actuating fluid to and from said cylinder; a delay cylinder, a delay piston in said delay cylinder, fluid conducting connections from the intermediate portions of said main cylinder to the end portions of said delay cylinder, valve actuating means adapted to be operated by movement of said delay piston, connections between said valve and said valve actuating means, and means for varying the stroke of said delay piston in said delay cylinder whereby the time which elapses between successive operations of said valve may be varied, said stroke varying means including a series of shoulders formed on said delay piston, an adjustable plunger connected to said valve actuating means and adapted to be engaged by different pairs of said shoulders when in different positions, and means for releasably retaining said plunger in a plurality of different positions.

9. In a windshield cleaner or the like, a cleaning element supported for reciprocating movement over the windshield, a fluid pressure actuated motor for reciprocating said cleaning element, means for delaying movement of said cleaning element at an end of its reciprocating stroke, and means for varying the duration of said delay independently of the rate of travel of said cleaning element over said windshield.

10. In a windshield cleaner or the like, a cleaning element supported for reciprocating movement over the windshield, a fluid pressure actuated motor for reciprocating said cleaning element, means for delaying movement of said cleaning element at an end of its reciprocating stroke, and means controllable independently of said delaying means for varying the rate of travel of said cleaning element over said windshield.

11. In a windshield cleaner or the like, a cleaning element supported for reciprocating movement over the windshield, a fluid pressure actuated motor for reciprocating said cleaning element, means for delaying movement of said cleaning element at an end of its reciprocating stroke, means for varying the duration of said delay independently of the rate of travel of said cleaning element over said windshield, and means separately controllable for varying the rate of travel of said cleaning element over said windshield.

12. In a fluid pressure actuated motor of the type described, a cylinder, a piston in said cylinder, means for discharging fluid under pressure into one end of said cylinder to move said piston therein, a port in said cylinder positioned to be exposed by said piston when said piston reaches a predetermined position in said cylinder, a delay chamber for creating delay in the operation of said piston at an end of its stroke, fluid conducting connections from said port to said delay chamber, a movable member in said chamber adapted to be moved by fluid entering said chamber from said cylinder, valve means for controlling the flow of fluid to said cylinder, and adjustable means, adapted to be engaged and operated by said movable member, for actuating said valve means to stop the flow of fluid into said end of said cylinder whereby the period of delay may be varied.

13. In a fluid pressure actuated motor, a drive member, walls defining a chamber in which said drive member is adapted to reciprocate, valve means for controlling the flow of fluid to and from said chamber, said valve means including an outer sleeve member and an inner member slidable within said sleeve, a valve actuating cylinder, a valve actuating piston in said cylinder, mechanical driving connections between said valve actuating piston and inner valve member, fluid conducting means extending from one end portion of said valve actuating cylinder and entering said chamber between the center and one end thereof, and fluid conducting means extending from the other end portion of said valve actuating cylinder and entering said chamber between the center and the other end thereof, said drive member being adapted to expose one of said fluid conducting means when at one end of its stroke and to expose the other of said fluid conducting means when at the other end of its stroke.

FREDERICK G. FOLBERTH.
WILLIAM M. FOLBERTH.